United States Patent
Aboghoniem et al.

(10) Patent No.: US 12,415,725 B2
(45) Date of Patent: Sep. 16, 2025

(54) ADAPTIVE CONTROL OF BTX REMOVAL IN SULFUR RECOVERY UNITS

(71) Applicant: Saudi Arabian Oil Company, Dhahran (SA)

(72) Inventors: Tarek D. Aboghoniem, Udhailiyah (SA); Abdullah A. Albader, Al Mubarraz (SA); Abdullraheem U. Almulla, Al Hofuf (SA)

(73) Assignee: Saudi Arabian Oil Company, Dhahran (SA)

( * ) Notice: Subject to any disclaimer, the term of this patent is extended or adjusted under 35 U.S.C. 154(b) by 514 days.

(21) Appl. No.: 17/974,256

(22) Filed: Oct. 26, 2022

(65) Prior Publication Data

US 2024/0140796 A1 May 2, 2024

(51) Int. Cl.
*C01B 17/04* (2006.01)
*B01D 53/04* (2006.01)

(52) U.S. Cl.
CPC ...... *C01B 17/0452* (2013.01); *B01D 53/0446* (2013.01); *B01D 53/0454* (2013.01); *C01B 17/0413* (2013.01); *B01D 2253/102* (2013.01); *B01D 2257/7027* (2013.01); *B01D 2259/40003* (2013.01)

(58) Field of Classification Search
CPC ............ C01B 17/0452; C01B 17/0413; B01D 53/0446; B01D 53/0454; B01D 2253/102; B01D 2257/7027; B01D 2259/40003; B01D 53/04

See application file for complete search history.

(56) References Cited

U.S. PATENT DOCUMENTS

| 3,703,068 A | 11/1972 | Wagner |
| 3,776,249 A | 12/1973 | Wailes et al. |

(Continued)

FOREIGN PATENT DOCUMENTS

| CN | 106774468 | 5/2017 |
| CN | 109824017 | 5/2019 |

(Continued)

OTHER PUBLICATIONS

Asadi et al., "An investigation of reaction furnace temperatures and sulfur recovery," Frontiers of Chemical Science and Engineering, Jun. 24, 2011, 5(3):362-371, 10 pages.

(Continued)

*Primary Examiner* — Anthony J Zimmer
(74) *Attorney, Agent, or Firm* — Fish & Richardson P.C.

(57) ABSTRACT

A system includes an outlet flowline from an activated carbon bed, a bypass flowline, a furnace, and a control system. The outlet flowline is configured to flow an acid gas stream out of the activated carbon bed after the activated carbon bed has removed benzene, toluene, and xylene from the acid gas stream. The bypass flowline includes a bypass valve and provides an alternative flow path for the acid gas stream exiting the activated carbon bed. The furnace includes a burner configured to combust at least a portion of the acid gas stream. The control system includes a temperature sensor and a controller. The temperature sensor is configured to measure a furnace temperature. The controller is configured to reduce a percent opening of the bypass valve based on the measured furnace temperature.

20 Claims, 2 Drawing Sheets

(56) References Cited

U.S. PATENT DOCUMENTS

| | | | |
|---|---|---|---|
| 4,543,245 | A | 9/1985 | Peterman et al. |
| 7,137,400 | B2 | 11/2006 | Bevers et al. |
| 2003/0194366 | A1 | 10/2003 | Srinivas et al. |
| 2006/0204432 | A1 | 9/2006 | Dolan et al. |
| 2015/0078984 | A1 | 3/2015 | Thielert |
| 2015/0298972 | A1* | 10/2015 | Ballaguet .................. C07C 7/12 423/575 |
| 2022/0234891 | A1 | 7/2022 | Thellefsen et al. |

FOREIGN PATENT DOCUMENTS

| | | |
|---|---|---|
| EP | 1230149 | 12/2005 |
| JP | S63285105 | 11/1988 |

OTHER PUBLICATIONS

Crevier et al., "BTX: Problem and solution—1: Activated carbon eliminates Claus deactivation problem," Oil and Gas Journal, Oct. 22, 2007, 105(40):60+62-66, 3 pages, Abstract Only.

Ibrahim, "Performance Assessment of a Sulphur Recovery Unit," Petroleum & Petrochemical Engineering Journal, Feb. 26, 2021, 5(1):1-9, 9 pages.

International Search Report and Written Opinion in International Appln. No. PCT/US2023/036000, mailed on Feb. 7, 2024, 28 pages.

Mahdipoor et al., "Adjusting the Furnace and Converter Temperature of the Sulfur Recovery Units," International Journal of Chemical and Molecular Engineering, Jan. 1, 2012, 6(7):627-630, 4 pages.

Ratzlaff, "Bypass Loop," Feb. 13, 2016, retrieved on Jan. 3, 2024, retrieved from URL <https://www.piping-designer.com/index.php/disciplines/mechanical/860-stationary-equipment/valve/valve-applications/1336-bypass-valve, 2 pages.

Sassi et al., "Sulfur Recovery from Acid Gas Using the Claus Process and High Temperature Air Combustion (HiTAC) Technology," American Journal of Environmental Sciences, May 1, 2008, 4(5):502-511, 10 pages.

Wilson et al., "Adaptive Control of Sulphur Recovery Units," ANDRITZ Automation, Nov. 27, 2021, 1-9, 9 pages.

Al-Abdullatif et al., "BTX Plant Performance Tests (Best Practice)," IPTC 12123, International Petroleum Technology Conference, 2008, 10 pages.

Crevier et al., "Enhanced Sulfur Recovery by Carbon Beds Installation," IPTC 11432, International Petroleum Technology Conference, Dec. 2007, 14 pages.

Duncan et al., "BTEX Removal from Natural Gas Streams," Department of Chemical, Biological and Materials Engineering, The University of Oklahoma, 2009, 17 pages.

\* cited by examiner

ADAPTIVE CONTROL OF BTX REMOVAL IN SULFUR RECOVERY UNITS

TECHNICAL FIELD

This disclosure relates to managing benzene, toluene, and xylene (BTX) in acid gas.

BACKGROUND

Hydrogen sulfide and carbon dioxide exist in various gas streams, including natural gas. Oil or gas that contains significant amounts of sulfur compounds like hydrogen sulfide is considered "sour", and oil refineries and gas processing plants utilize "sweetening" processes to remove such sulfur compounds. A typical sulfur recovery process includes the Claus process, which recovers elemental sulfur from gaseous hydrogen sulfide. The Claus process utilizes oxygen to oxidize hydrogen sulfide into sulfur dioxide, and the sulfur dioxide catalytically reacts with hydrogen sulfide to produce elemental sulfur. The existence of some compounds, such as benzene, toluene, and xylene (also referred to as BTX) in the gas stream can be detrimental to the process. For example, the presence of BTX can interfere with the catalytic conversion of sulfur dioxide into elemental sulfur.

SUMMARY

This disclosure describes technologies relating to removal of BTX from acid gas in sulfur recovery units (SRUs), and in particular, adaptive control of bypass valves for minimizing moisture carryover, thereby mitigating and/or eliminating SRU furnace flameout and unit trips. Certain aspects of the subject matter described can be implemented as a system. The system includes an acid gas stream, an outlet pipe manifold, multiple activated carbon beds, a furnace, and a control system. For each activated carbon bed, the system includes an outlet flowline and a bypass flowline. The acid gas stream includes hydrogen sulfide, benzene, toluene, and xylene. Each activated carbon bed is configured to remove benzene, toluene, and xylene (BTX) from the acid gas stream in response to contacting the acid gas stream. The activated carbon beds are in a parallel flow configuration. Each outlet flowline connects the respective activated carbon bed to the outlet pipe manifold. Each outlet flowline includes an outlet valve that is configured to control flow of the acid gas stream exiting the respective activated carbon bed through the respective outlet flowline. Each bypass flowline is connected to the respective outlet flowline. Each bypass flowline has an inner diameter that is smaller in comparison to an inner diameter of the respective outlet flowline. Each bypass flowline provides an alternative flow path for the acid gas stream exiting the respective activated carbon bed around the respective outlet flowline. Each bypass flowline includes a bypass valve that is configured to control flow of the acid gas stream exiting the respective activated carbon bed through the respective bypass flowline. The furnace is in fluid communication with the outlet pipe manifold. The furnace is configured to receive the acid gas stream from the outlet pipe manifold. The furnace includes a burner. The burner is configured to combust at least a portion of the acid gas stream in the presence of oxygen. The control system includes a temperature sensor. The temperature sensor is coupled to the furnace. The control system is communicatively coupled to each bypass valve. The temperature sensor is configured to measure a furnace temperature of the furnace. The control system is configured to adjust a percent opening of at least one of the bypass valves based on the furnace temperature measured by the temperature sensor.

This, and other aspects, can include one or more of the following features. The temperature sensor can be configured to transmit the measured furnace temperature. The control system can include a controller that is communicatively coupled to the temperature sensor and to each bypass valve. The controller can include one or more processors and a non-transitory computer-readable storage medium that is coupled to the one or more processors. The storage medium can store programming instructions by execution by the one or more processors. The programming instructions can instruct the one or more processors to perform operations. The operations can include receiving the measured furnace temperature from the temperature sensor. The operations can include determining a difference between the measured furnace temperature and a specified setpoint temperature. The operations can include transmitting a close signal to at least one of the bypass valves to reduce the percent opening of the respective bypass valve in response to determining that the difference between the measured furnace temperature and the specified setpoint temperature is equal to or greater than 10 degrees Fahrenheit (° F.) differential. For each 10° F. differential in the difference between the measured furnace temperature and the specified setpoint temperature, the controller can be configured to reduce the percent opening of the respective bypass valve by 10% down to a minimum percent opening of 50%. The specified setpoint temperature can be about 1,950° F. For each activated carbon bed, a ratio of the inner diameter of the bypass flowline to the inner diameter of the outlet flowline can be in a range of from 6:32 to 10:28. For each outlet flowline, a ratio of the inner diameter of the respective outlet flowline to an inner diameter of the outlet pipe manifold can be in a range of from 28:44 to 32:40. The system can include a preheater installed on the outlet pipe manifold upstream of the furnace. The preheater can be configured to heat the acid gas stream prior to the acid gas stream entering the furnace. The system can include a main bypass flowline connected to the outlet pipe manifold and the furnace. The main bypass flowline can provide an alternative flow path for the acid gas stream to bypass the preheater and the burner. The main bypass flowline can include a main bypass valve. The main bypass valve can be configured to control flow of the acid gas stream through the main bypass flowline.

Certain aspects of the subject matter described can be implemented as a system. The system includes an outlet flowline from an activated carbon bed, a bypass flowline, a furnace, and a control system. The outlet flowline is configured to flow an acid gas stream out of the activated carbon bed after the activated carbon bed has removed benzene, toluene, and xylene from the acid gas stream. The bypass flowline is connected to the outlet flowline. The bypass flowline has an inner diameter that is smaller in comparison to an inner diameter of the outlet flowline. The bypass flowline provides an alternative flow path for the acid gas stream exiting the activated carbon bed around the outlet flowline. The bypass flowline includes a bypass valve. The bypass valve is configured to control flow of the acid gas stream exiting the activated carbon bed through the bypass flowline. The furnace is configured to receive the acid gas stream from at least one of the outlet flowline or the bypass flowline. The furnace includes a burner. The burner is configured to combust at least a portion of the acid gas stream in the presence of oxygen. The control system includes a temperature sensor and a controller. The temperature sensor is coupled to the furnace. The temperature sensor is configured to measure a furnace temperature of the furnace. The temperature sensor is configured to transmit the measured furnace temperature. The controller is communicatively coupled to the temperature sensor and to the bypass valve. The controller is configured to receive the measured furnace temperature from the temperature sensor. The controller is configured to determine a difference between the measured furnace temperature and a specified setpoint temperature. The controller is configured to reduce a percent opening of the bypass valve in response to determining that the difference between the measured furnace temperature and the specified setpoint temperature is equal to or greater than 10° F. differential.

This, and other aspects, can include one or more of the following features. For each 10° F. differential in the difference between the measured furnace temperature and the specified setpoint temperature, the controller can be configured to reduce the percent opening of the bypass valve by 10% down to a minimum percent opening of 50%. The specified setpoint temperature can be about 1,950° F. A ratio of the inner diameter of the bypass flowline to the inner diameter of the outlet flowline can be in a range of from 6:32 to 10:28. A ratio of the inner diameter of the outlet flowline to an inner diameter of the outlet pipe manifold can be in a range of from 28:44 to 32:40. The system can include a preheater installed on the outlet pipe manifold upstream of the furnace. The preheater can be configured to heat the acid gas stream prior to the acid gas stream entering the furnace. The system can include a main bypass flowline connected to the outlet pipe manifold and the furnace. The main bypass flowline can provide an alternative flow path for the acid gas stream to bypass the preheater and the burner. The main bypass flowline can include a main bypass valve. The main bypass valve can be configured to control flow of the acid gas stream through the main bypass flowline.

Certain aspects of the subject matter described can be implemented as a method. An acid gas stream is flowed to an activated carbon bed. The acid gas stream includes hydrogen sulfide, benzene, toluene, and xylene. The activated carbon bed removes benzene, toluene, and xylene from the acid gas stream. The acid gas stream is flowed from the activated carbon bed to a furnace. The furnace includes a burner. The burner combusts at least a portion of the acid gas stream in the presence of oxygen. A temperature sensor coupled to the furnace measures a furnace temperature of the furnace. A controller communicatively coupled to the temperature sensor determines a difference between the measured furnace temperature and a specified setpoint temperature. The controller adjusts flow of the acid gas stream from the activated carbon bed to the furnace in response to determining that the difference between the measured furnace temperature and the specified setpoint temperature is equal to or greater than 10° F. differential.

This, and other aspects, can include one or more of the following features. The activated carbon bed can include an outlet flowline and a bypass flowline that is connected to the outlet flowline. The bypass flowline can have an inner diameter that is smaller in comparison to an inner diameter of the outlet flowline. The bypass flowline can provide an alternative flow path for the acid gas stream exiting the activated carbon bed around the outlet flowline. The bypass flowline can include a bypass valve. Flowing the acid gas stream from the activated carbon bed to the furnace can include flowing at least a portion of the acid gas stream from the activated carbon bed through the bypass flowline to the furnace. Adjusting flow of the acid gas stream from the activated carbon bed to the furnace can include transmitting, by the controller, a close signal to the bypass valve to reduce a percent opening of the bypass valve in response to determining that the difference between the measured furnace temperature and the specified setpoint temperature is equal to or greater than 10° F. differential. For each 10° F. differential in the difference between the measured furnace temperature and the specified setpoint temperature, the close signal transmitted by the controller can cause the percent opening of the bypass valve to reduce by 10% down to a minimum percent opening of 50%. The specified setpoint temperature can be about 1,950° F.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes removal of BTX from acid gas in SRUs. The BTX removal is implemented by distributing the acid gas through activated carbon beds. At least two activated carbon beds are included, such that one of the beds may be put on a regeneration cycle to be reactivated while the other bed(s) are kept online. The beginning of acid gas admission through the activated carbon beds to the furnace has the greatest risk and extent of moisture carryover, which can detrimentally result in furnace flameout and unit downtime.

The subject matter described in this disclosure can be implemented in particular implementations, so as to realize one or more of the following advantages. The process is equipped with a control scheme that provides adaptive control for bypass control valves linked to the SRU reaction furnace temperature to minimize moisture carryover, thereby mitigating and/or eliminating SRU furnace flameout and unit trips. The control schemes described can mitigate and/or eliminate the potential of activating emergency shutdown by gradually admitting the acid gas through the smaller bypass control valve(s) first before opening the larger outlet valve(s) to the SRU reaction furnace to mitigate and/or eliminate the risk of sudden, high moisture content from reaching the SRU reaction furnace, which could detrimentally lead to flameout and activation of unit emergency shutdown. The systems and processes described can prevent unnecessary activation of emergency shutdown bypasses during acid gas admission to the SRU furnace and can therefore ensure safe and reliable SRU operations. The control schemes described can mitigate and/or eliminate BTX and hydrocarbon carryover, which can detrimentally deactivate and shorten the operating life of SRU catalyst(s) downstream of the SRU reaction furnace. Thus, the processes and systems described can improve sulfur recovery operations while remaining within safe environmental emissions limits.

Figure 1:
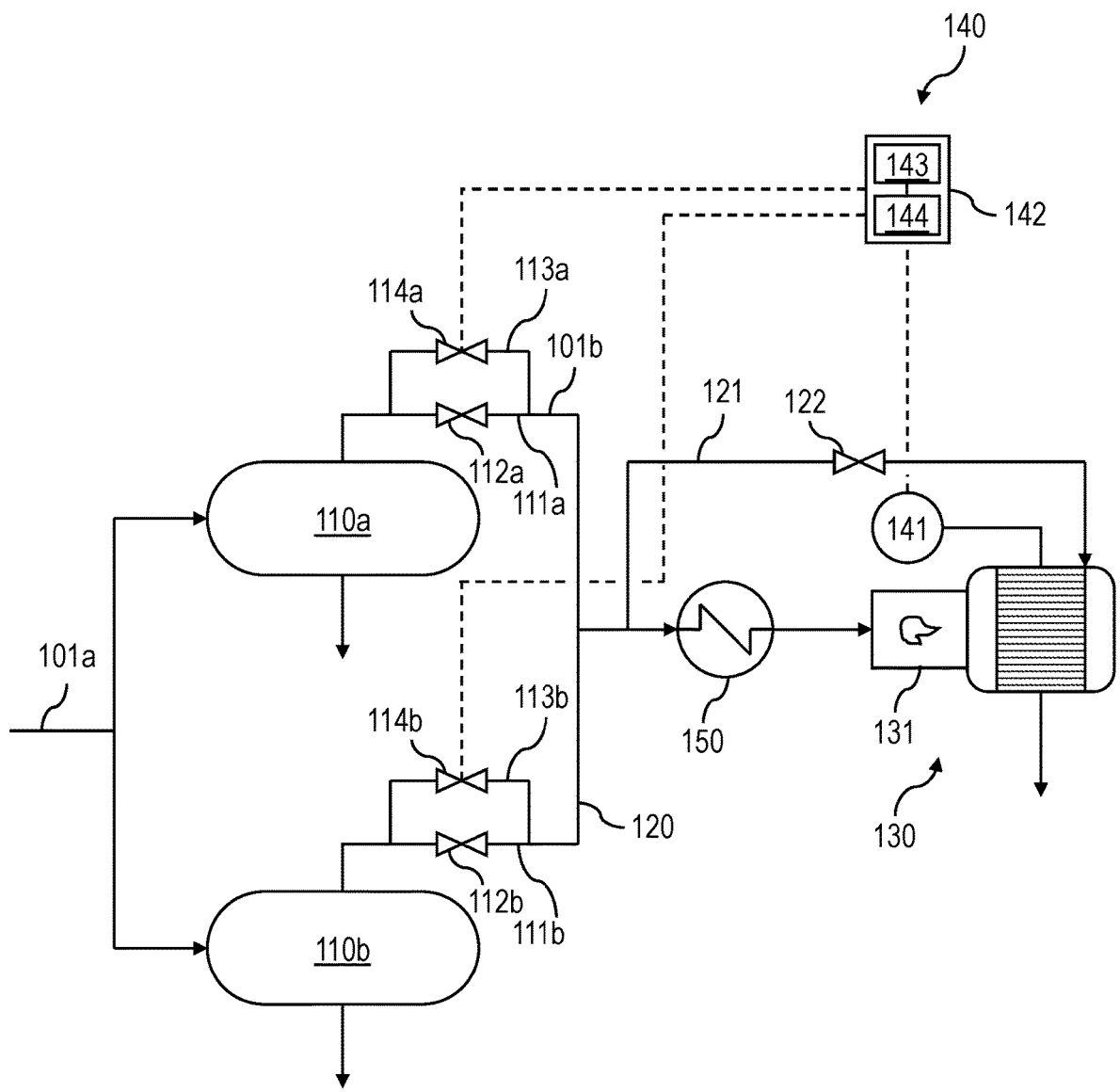
FIG. 1 is a schematic diagram of an example system including removal of BTX from acid gas in an SRU.

FIG. 1 is a schematic diagram of an example system 100 including BTX removal from acid gas in an SRU. The system 100 can, for example, be an SRU. The system 100 includes an acid gas stream 101a, multiple activated carbon beds 110, an outlet pipe manifold 120, a furnace 130, and a control system 140. Each activated carbon bed is labeled with reference number 110 followed by a letter for differentiation. In some implementations, as shown in FIG. 1, the system 100 includes two activated carbon beds 110a, 110b. Although shown in FIG. 1 as including two activated carbon beds (110a, 110b), the system 100 can include only one activated carbon bed or more than two activated carbon beds (for example, three, four, or more than four). The activated carbon beds 110 are in a parallel flow configuration. In some implementations, the system 100 can include at least two activated carbon beds (110a, 110b), such that at least one of the activated carbon beds can be reactivated while the remaining activated carbon bed(s) remain online, so that the system 100 does not need to be taken offline for reactivation of the carbon beds 110.

Each activated carbon bed (110a, 110b) is configured to remove BTX from the acid gas stream 101a in response to contacting the acid gas stream 101a. Each activated carbon bed (110a, 110b) includes a bed of activated carbon. For each of the activated carbon beds (110a, 110b), as the acid gas stream 101a flows through, BTX adsorbs to the activated carbon. The acid gas stream 101b exiting the activated carbon beds 110 has a reduced BTX content in comparison to the acid gas stream 101a entering the activated carbon beds 110. For example, the acid gas stream 101b exiting the activated carbon beds 110 is substantially free of BTX or includes only a negligible amount of BTX. In some implementations, the system 100 includes a heater (not shown) upstream of the activated carbon beds 110. The heater can be configured to pre-heat the acid gas stream 101a prior to entering the activated carbon beds 110. Pre-heating the acid gas stream 101a can, for example, facilitate removal of BTX by the activated carbon beds 110.

Each activated carbon bed (110a, 110b) includes an outlet flowline (111a, 111b, respectively) and a bypass flowline (113a, 113b). Each outlet flowline (111a, 111b) connects the respective activated carbon bed (110a, 110b) to the outlet pipe manifold 120. Each outlet flowline (111a, 111b) includes an outlet valve (112a, 112b, respectively). Each outlet valve (112a, 112b) is configured to control flow of the acid gas stream 101b exiting the respective activated carbon bed (110a, 110b) through the respective outlet flowline (111a, 111b). Each bypass flowline (113a, 113b) is connected to the respective outlet flowline (111a, 111b). Each bypass flowline (113a, 113b) has an inner diameter that is smaller in comparison to an inner diameter of the respective outlet flowline (111a, 111b). Each bypass flowline (113a, 113b) provides an alternative flow path for the acid gas stream 101b exiting the respective activated carbon bed (110a, 110b) around the respective outlet flowline (111a, 111b). Each bypass flowline (113a, 113b) includes a bypass valve (114a, 114b, respectively). Each bypass valve (114a, 114b) is configured to control flow of the acid gas stream 101b exiting the respective activated carbon bed (110a, 110b) through the respective bypass flowline (113a, 113b). In some implementations, for each activated carbon bed (110a, 110b), a ratio of the inner diameter of the bypass flowline (113a, 113b) to the inner diameter of the respective outlet flowline (111a, 111b) is in a range of from 6:32 to 10:28. For example, for each activated carbon bed (110a, 110b), the inner diameter of the bypass flowline (113a, 113b) is about 8 inches and the inner diameter of the respective outlet flowline (111a, 111b) is about 30 inches (ratio of about 8:30). In some implementations, for each outlet flowline (111a, 111b), a ratio of the inner diameter of the respective outlet flowline (111a, 111b) to an inner diameter of the outlet pipe manifold 120 is in a range of from 28:44 to 32:40. For example, for each outlet flowline (111a, 111b), the inner diameter of the respective outlet flowline (111a, 111b) is about 30 inches, and the inner diameter of the outlet pipe manifold 120 is about 42 inches (ratio of about 30:42). In some implementations, the outlet pipe manifold 120 is sized to accommodate a flow rate of the acid gas stream 101b in a range of from about 45 million standard cubic feet per day (MMSCFD) to about 70 MMSCFD.

The furnace 130 is in fluid communication with the outlet pipe manifold 120. The furnace 130 is configured to receive the acid gas stream 101b from the outlet pipe manifold 120. The furnace 130 includes a burner 131. The burner 131 is configured to combust at least a portion of the acid gas stream 101b in the presence of oxygen. Combustion of the acid gas stream 101b within the furnace 130 oxidizes the hydrogen sulfide into sulfur dioxide. The sulfur dioxide can be catalytically converted to elemental sulfur, for example, in a downstream catalytic bed convertor.

The control system 140 includes a temperature sensor 141. The temperature sensor 141 is coupled to the furnace 130. The temperature sensor 141 is configured to measure a furnace temperature of the furnace 130. The control system 140 is communicatively coupled to each bypass valve (114a, 114b). The control system 140 is configured to adjust a percent opening of at least one of the bypass valves (114a, 114b) based on the furnace temperature measured by the temperature sensor 141. The control system 140 can include a controller 142. The controller 142 can be communicatively coupled to the temperature sensor 141 and each bypass valve (114a, 114b). The temperature sensor 141 can be configured to transmit the measured furnace temperature, for example, to the controller 142.

The controller 142 can include one or more processors 143 and a non-transitory computer-readable storage medium (memory) 144. 142 The processor 143 may be a microprocessor, a multi-core processor, a multithreaded processor, an ultra-low-voltage processor, an embedded processor, or a virtual processor. In some implementations, the processor 143 may be part of a system-on-a-chip (SoC) in which the processor 143 and the other components of the controller 142 are formed into a single integrated electronics package. In some implementations, the processor 143 may include processors from Intel® Corporation of Santa Clara, California, from Advanced Micro Devices, Inc. (AMD) of Sunnyvale, California, or from ARM Holdings, LTD., Of Cambridge, England. Any number of other processors from other suppliers may also be used. Generally, the processor 143 executes instructions and manipulates data to perform the operations of the controller 142 and any algorithms, methods, functions, processes, flows, and procedures as described in this specification. The processor 143 may communicate with other components of the controller 142 over a bus. The bus may include any number of technologies, such as industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in an SoC based system. Other bus technologies may be used, in addition to, or instead of, the technologies above.

The memory 144 is coupled to the one or more processors 143 and stores programming instructions for execution by the one or more processors 143. The programming instructions instruct the one or more processors 143 to perform operations. The memory 144 can hold data for the controller 142 or other components (or a combination of both) that can be connected to the network. While memory 144 is illustrated as an integral component of the controller 142, the memory 144 can be external to the controller 142. The memory 144 can be a transitory or non-transitory storage medium. In some implementations, such as in PLCs and other process control units, the memory 144 is integrated with a database used for long-term storage of programs and data. The memory 144 can include any number of volatile and nonvolatile memory devices, such as volatile random-access memory (RAM), static random-access memory (SRAM), flash memory, and the like. In smaller devices, such as PLCs, the memory 144 may include registers associated with the processor 143 itself.

The controller 142 can receive the measured furnace temperature from the temperature sensor 141. The controller 142 can determine a difference between the measured furnace temperature and a specified setpoint temperature. The controller 142 can transmit a close signal to at least one of the bypass valves (114a, 114b) to reduce the percent opening of the respective bypass valve (114a, 114b) in response to determining that the difference between the measured furnace temperature and the specified setpoint temperature is equal to or greater than 10 degrees Fahrenheit (° F.) differential. In some implementations, the specified setpoint temperature is about 1,950° F. (for example, 1,920° F., 1,930° F., 1,940° F., 1,950° F., 1,960° F., or 1,970° F.). In some implementations, for each 10° F. differential in the difference between the measured furnace temperature and the specified setpoint temperature, the controller 142 is configured to reduce the percent opening of the respective bypass valve (114a, 114b) by 10% down to a minimum percent opening of 50%. For example, if the specified setpoint temperature is 1,950° F. and the controller 142 determines that the furnace temperature measured by the temperature sensor 141 is equal to or less than 1,940° F., the controller 142 transmits the close signal to at least one of the bypass valves (114a, 114b) to reduce the percent opening of the respective bypass valve (114a, 114b) by 10%, but the resulting percent opening of the respective bypass valve (114a, 114b) will be no less than 50%. As another example, if the specified setpoint temperature is 1,950° F. and the controller 142 determines that the furnace temperature measured by the temperature sensor 141 is equal to or less than 1,930° F., the controller 142 transmits the close signal to at least one of the bypass valves (114a, 114b) to reduce the percent opening of the respective bypass valve (114a, 114b) by 20%, but the resulting percent opening of the respective bypass valve (114a, 114b) will be no less than 50%. As another example, if the specified setpoint temperature is 1,950° F. and the controller 142 determines that the furnace temperature measured by the temperature sensor 141 is equal to or less than 1,920° F., the controller 142 transmits the close signal to at least one of the bypass valves (114a, 114b) to reduce the percent opening of the respective bypass valve (114a, 114b) by 30%, but the resulting percent opening of the respective bypass valve (114a, 114b) will be no less than 50%. As another example, if the specified setpoint temperature is 1,950° F. and the controller 142 determines that the furnace temperature measured by the temperature sensor 141 is equal to or less than 1,910° F., the controller 142 transmits the close signal to at least one of the bypass valves (114a, 114b) to reduce the percent opening of the respective bypass valve (114a, 114b) by 40%, but the resulting percent opening of the respective bypass valve (114a, 114b) will be no less than 50%. As another example, if the specified setpoint temperature is 1,950° F. and the controller 142 determines that the furnace temperature measured by the temperature sensor 141 is equal to or less than 1,900° F., the controller 142 transmits the close signal to at least one of the bypass valves (114a, 114b) to reduce the percent opening of the respective bypass valve (114a, 114b) by 50%, but the resulting percent opening of the respective bypass valve (114a, 114b) will be no less than 50%. Once the furnace temperature has returned to the specified setpoint temperature, the percent opening of the bypass valve(s) (114a, 114b) can be increased (for example, back to 100% (fully open)).

In some implementations, the system 100 includes a preheater 150. The preheater 150 can be installed on the outlet pipe manifold 120 upstream of the furnace 130. The preheater 150 can be configured to heat the acid gas stream 101b prior to the acid gas stream 101b entering the furnace 130. In some implementations, the system 100 includes a main bypass flowline 121. The main bypass flowline 121 can be connected to the outlet pipe manifold 120 and the furnace 130. The main bypass flowline 121 can provide an alternative flow path for the acid gas stream 101b to bypass the preheater 150 and the burner 131 of the furnace 130. The main bypass flowline 121 can include a main bypass valve 122. The main bypass valve 122 can be configured to control flow of the acid gas stream 101b through the main bypass flowline 121. In some implementations, the acid gas stream 101b splits across the outlet pipe manifold 120 and the main bypass flowline 121. For example, under normal operation, about ⅔ of the acid gas stream 101b flows through the main bypass flowline 121, and the remaining portion of the acid gas stream 101b flows through the outlet pipe manifold 120. The percent opening of the main bypass valve 122 can be, for example, controlled by the control system 140.

Figure 2:
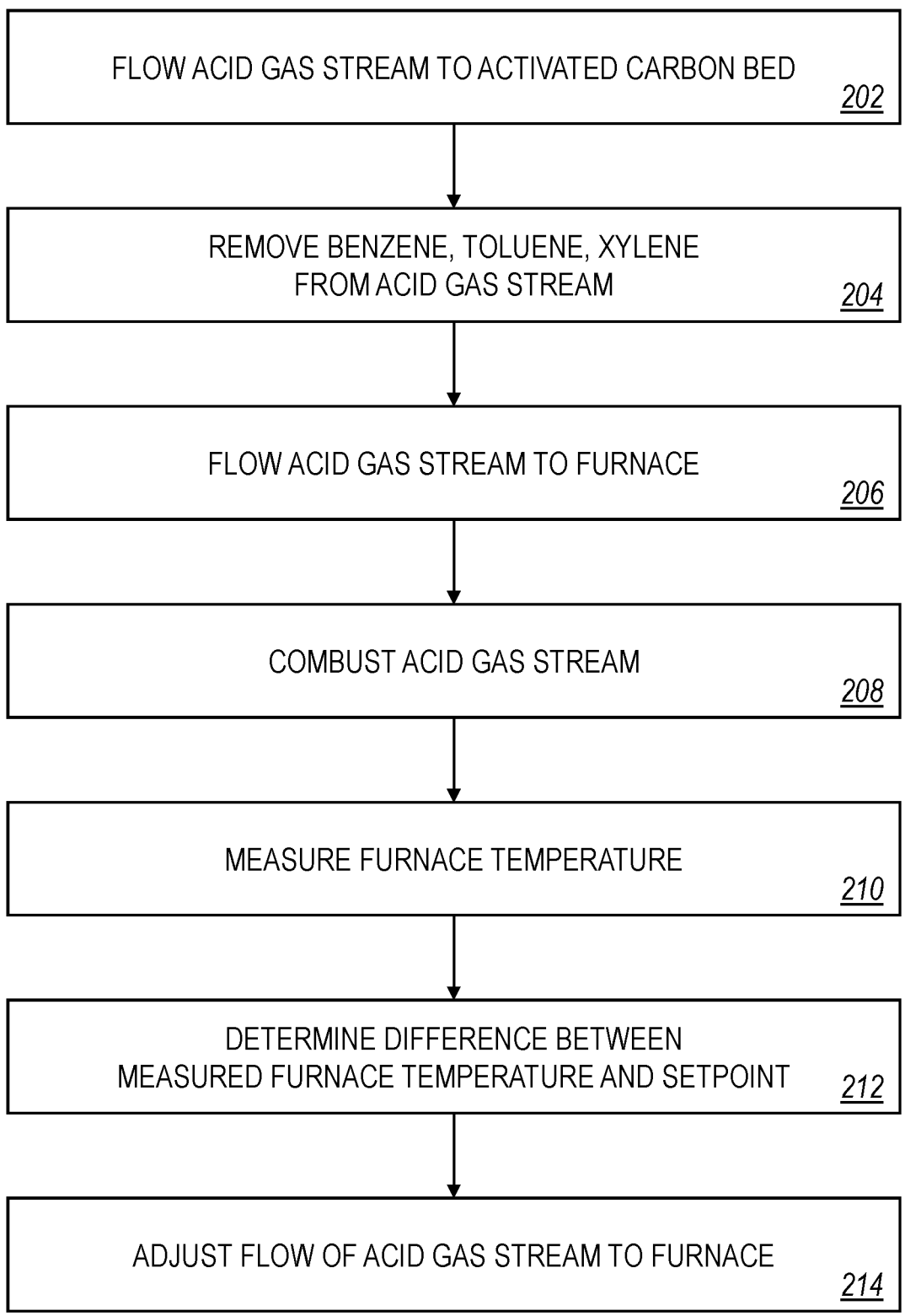
FIG. 2 is a flow chart of an example method for adaptive control of BTX removal from acid gas in an SRU.

FIG. 2 is a flow chart of an example method 200 for adaptive control of BTX removal from acid gas in an SRU. The system 100 can, for example, implement the method 200. At block 202, an acid gas stream (such as the acid gas stream 101a) is flowed to an activated carbon bed (such as the activated carbon bed 110a). In this scenario, the second activated carbon bed 110b can be undergoing a reactivation process to reactivate the carbon bed. At block 204, the activated carbon bed 110a removes BTX from the acid gas stream 101a. At block 206, the acid gas stream 101b (BTX removed) is flowed from the activated carbon bed 110a to a furnace (such as the furnace 130). As described previously, the furnace 130 includes the burner 131. At block 208, the burner 131 combusts at least a portion of the acid gas stream 101b in the presence of oxygen. Combusting the acid gas stream 101b at block 208 oxidizes the hydrogen sulfide to produce sulfur dioxide. The sulfur dioxide can be catalytically converted to elemental sulfur. At block 210, a temperature sensor (such as the temperature sensor 141 coupled to the furnace 130) measures a furnace temperature of the furnace 130. At block 212, a controller (such as the controller 142 communicatively coupled to the temperature sensor 141) determines a difference between the measured furnace temperature (block 210) and a specified setpoint temperature. At block 214, the controller 142 adjusts flow of the acid gas stream 101b from the activated carbon bed 110a to the furnace 130 in response to determining that the difference between the measured furnace temperature and the specified setpoint temperature is equal to or greater than 10° F. differential.

In some implementations, flowing the acid gas stream 101b from the activated carbon bed 110a to the furnace 130 at block 206 includes flowing at least a portion of the acid gas stream 101b from the activated carbon bed 110a through the bypass flowline 113a. For example, during acid gas admission to the furnace 130 at block 206, the bypass valve 114a is open while the outlet valve 112a is closed, such that the acid gas stream 101b is routed through the bypass flowline 113a as opposed to the outlet flowline 111a. Because the bypass flowline 113a has a smaller cross-sectional flow area in comparison to the outlet flowline 111a, flow of the acid gas stream 101b is limited, and sudden, high volume flow to the furnace 130 can be avoided and/or prevented. In some implementations, adjusting flow of the acid gas stream 101b from the activated carbon bed 110a to the furnace 130 at block 214 can include transmitting, by the controller 142, a close signal to the bypass valve 114a to reduce a percent opening (for example, reduce by 10%) in response to determining that the difference between the measured furnace temperature and the specified temperature is equal to or greater than 10° F. differential. The method 200 can be repeated/continued for a time duration that is considered sufficient for reaching normal operation of the SRU. For example, the method 200 can be repeated/continued for at least 20 minutes, and then the outlet valve 112a can be gradually opened to increase flow of the acid gas stream 101b to the furnace 130 for sulfur removal.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A system comprising:
    an acid gas stream comprising hydrogen sulfide, benzene, toluene, and xylene;
    an outlet pipe manifold;
    a plurality of activated carbon beds, each activated carbon bed configured to remove benzene, toluene, and xylene from the acid gas stream in response to contacting the acid gas stream, the plurality of activated carbon beds in a parallel flow configuration;
    for each activated carbon bed:
        an outlet flowline connecting the respective activated carbon bed to the outlet pipe manifold, the outlet flowline comprising an outlet valve configured to control flow of the acid gas stream exiting the respective activated carbon bed through the outlet flowline;
        a bypass flowline connected to the outlet flowline, the bypass flowline having an inner diameter that is smaller in comparison to an inner diameter of the outlet flowline, the bypass flowline providing an alternative flow path for the acid gas stream exiting the respective activated carbon bed around the outlet flowline, the bypass flowline comprising a bypass valve configured to control flow of the acid gas stream exiting the respective activated carbon bed through the bypass flowline;
    a furnace in fluid communication with the outlet pipe manifold and configured to receive the acid gas stream from the outlet pipe manifold, the furnace comprising a burner configured to combust at least a portion of the acid gas stream in the presence of oxygen;
    a control system comprising a temperature sensor coupled to the furnace, the control system communicatively coupled to each bypass valve, the temperature sensor configured to measure a furnace temperature of the furnace, wherein the control system is configured to adjust a percent opening of at least one of the bypass valves based on the furnace temperature measured by the temperature sensor.

2. The system of claim 1, wherein the temperature sensor is configured to transmit the measured furnace temperature, and the control system comprises a controller communicatively coupled to the temperature sensor and to each bypass valve, the controller comprising:
one or more processors; and
a non-transitory computer-readable storage medium coupled to the one or more processors and storing programming instructions for execution by the one or more processors, the programming instructions instructing the one or more processors to perform operations comprising:
receiving the measured furnace temperature from the temperature sensor;
determining a difference between the measured furnace temperature and a specified setpoint temperature; and
transmitting a close signal to at least one of the bypass valves to reduce the percent opening of the respective bypass valve in response to determining that the difference between the measured furnace temperature and the specified setpoint temperature is equal to or greater than 10 degrees Fahrenheit (° F.) differential.

3. The system of claim 2, wherein for each 10° F. differential in the difference between the measured furnace temperature and the specified setpoint temperature, the controller is configured to reduce the percent opening of the respective bypass valve by 10% down to a minimum percent opening of 50%.

4. The system of claim 3, wherein the specified setpoint temperature is about 1,950° F.

5. The system of claim 4, wherein for each activated carbon bed, a ratio of the inner diameter of the bypass flowline to the inner diameter of the outlet flowline is in a range of from 6:32 to 10:28.

6. The system of claim 5, wherein for each outlet flowline, a ratio of the inner diameter of the respective outlet flowline to an inner diameter of the outlet pipe manifold is in a range of from 28:44 to 32:40.

7. The system of claim 6, comprising a preheater installed on the outlet pipe manifold upstream of the furnace, the preheater configured to heat the acid gas stream prior to the acid gas stream entering the furnace.

8. The system of claim 7, comprising a main bypass flowline connected to the outlet pipe manifold and the furnace, the main bypass flowline providing an alternative flow path for the acid gas stream to bypass the preheater and the burner, the main bypass flowline comprising a main bypass valve configured to control flow of the acid gas stream through the main bypass flowline.

9. A system comprising:
an outlet flowline from an activated carbon bed, the outlet flowline configured to flow an acid gas stream out of the activated carbon bed after the activated carbon bed has removed benzene, toluene, and xylene from the acid gas stream;
a bypass flowline connected to the outlet flowline, the bypass flowline having an inner diameter that is smaller in comparison to an inner diameter of the outlet flowline, the bypass flowline providing an alternative flow path for the acid gas stream exiting the activated carbon bed around the outlet flowline, the bypass flowline comprising a bypass valve configured to control flow of the acid gas stream exiting the activated carbon bed through the bypass flowline;
a furnace configured to receive the acid gas stream from at least one of the outlet flowline or the bypass flowline, the furnace comprising a burner configured to combust at least a portion of the acid gas stream in the presence of oxygen;
a control system comprising:
a temperature sensor coupled to the furnace, the temperature sensor configured to measure a furnace temperature of the furnace and transmit the measured furnace temperature; and
a controller communicatively coupled to the temperature sensor and to the bypass valve, the controller configured to:
receive the measured furnace temperature from the temperature sensor;
determine a difference between the measured furnace temperature and a specified setpoint temperature; and
reduce a percent opening of the bypass valve in response to determining that the difference between the measured furnace temperature and the specified setpoint temperature is equal to or greater than 10 degrees Fahrenheit (° F.) differential.

10. The system of claim 9, wherein for each 10° F. differential in the difference between the measured furnace temperature and the specified setpoint temperature, the controller is configured to reduce the percent opening of the bypass valve by 10% down to a minimum percent opening of 50%.

11. The system of claim 10, wherein the specified setpoint temperature is about 1,950° F.

12. The system of claim 11, wherein a ratio of the inner diameter of the bypass flowline to the inner diameter of the outlet flowline is in a range of from 6:32 to 10:28.

13. The system of claim 12, wherein a ratio of the inner diameter of the outlet flowline to an inner diameter of the outlet pipe manifold is in a range of from 28:44 to 32:40.

14. The system of claim 13, comprising a preheater installed on the outlet pipe manifold upstream of the furnace, the preheater configured to heat the acid gas stream prior to the acid gas stream entering the furnace.

15. The system of claim 14, comprising a main bypass flowline connected to the outlet pipe manifold and the furnace, the main bypass flowline providing an alternative flow path for the acid gas stream to bypass the preheater and the burner, the main bypass flowline comprising a main bypass valve configured to control flow of the acid gas stream through the main bypass flowline.

16. A method comprising:
flowing an acid gas stream to an activated carbon bed, the acid gas stream comprising hydrogen sulfide, benzene, toluene, and xylene;
removing, by the activated carbon bed, benzene, toluene, and xylene from the acid gas stream;
flowing the acid gas stream from the activated carbon bed to a furnace comprising a burner;
combusting, by the burner, at least a portion of the acid gas stream in the presence of oxygen;
measuring, by a temperature sensor coupled to the furnace, a furnace temperature of the furnace;

determining, by a controller communicatively coupled to the temperature sensor, a difference between the measured furnace temperature and a specified setpoint temperature; and adjusting, by the controller, flow of the acid gas stream from the activated carbon bed to the furnace in response to determining that the difference between the measured furnace temperature and the specified setpoint temperature is equal to or greater than 10 degrees Fahrenheit (° F.) differential.

17. The method of claim 16, wherein:

the activated carbon bed comprises an outlet flowline and a bypass flowline connected to the outlet flowline;

the bypass flowline has an inner diameter that is smaller in comparison to an inner diameter of the outlet flowline;

the bypass flowline provides an alternative flow path for the acid gas stream exiting the activated carbon bed around the outlet flowline;

the bypass flowline comprises a bypass valve; and flowing the acid gas stream from the activated carbon bed to the furnace comprises flowing at least a portion of the acid gas stream from the activated carbon bed through the bypass flowline to the furnace.

18. The method of claim 17, wherein adjusting flow of the acid gas stream from the activated carbon bed to the furnace comprises transmitting, by the controller, a close signal to the bypass valve to reduce a percent opening of the bypass valve in response to determining that the difference between the measured furnace temperature and the specified setpoint temperature is equal to or greater than 10° F. differential.

19. The method of claim 18, wherein for each 10° F. differential in the difference between the measured furnace temperature and the specified setpoint temperature, the close signal transmitted by the controller causes the percent opening of the bypass valve to reduce by 10% down to a minimum percent opening of 50%.

20. The method of claim 19, wherein the specified setpoint temperature is about 1,950° F.

* * * * *